UNITED STATES PATENT OFFICE 2,683,757

SEPARATION OF NAPHTHENE HYDROCARBONS

Robert M. Kennedy, Newtown Square, and Abraham Schneider, Philadelphia, Pa., assignors to Sun Oil Company, Philadelphia, Pa., a corporation of New Jersey No Drawing. Application June 11, 1951, Serial No. 231,058

17 Claims. (Cl. 260—666)

This invention relates to a method of separating naphthenes. More particularly, the present invention is directed to a method of separating alkyl substituted cyclopentanes from cyclohexanes.

Naturally occuring naphthenes are principally those having a ring composed of either 5 or 6 carbon atoms and at least 1 alkyl substituent. The boiling points of the cyclopentanes and cyclohexanes are frequently sufficiently close so as to prevent their separation by distillation or other physical methods. For example, a wide variety of naphthenes occurs in petroleum. The selective separation of cyclopentanes from a petroleum fraction, with resulting concentration of the unremoved naphthene, is difficult or impossible by heretofore known methods of hydrocarbon separation. A method of separating naphthenes from each other and from other hydrocarbons is important in order that derivatives of the separated naphthene may be prepared in substantially pure form, for analytical purposes, and to obtain a hydrocarbon fraction free of naphthenes. For example, the preparation of derivatives of cyclohexanes in the presence of cyclopentanes usually results in a mixture of derivatives of both of the naphthenes, separation of which may be difficult; analytical procedures for determining naphthenes in admixture with other hydrocarbons do not distinguish cyclopentanes from cyclohexanes; the separation of naphthenes from other hydrocarbons by dehydrogenation of the naphthenes to aromatics and separation of the aromatics, such as by adsorption on silica gel, is not applicable for the removal of cyclopentanes which, of course, cannot be dehydrogenated to form aromatics without first isomerizing the cyclopentanes to cyclohexanes.

An object of the present invention is to provide a method for the separation of alkyl substituted cyclopentanes from cyclohexanes. Another object is to provide a method for concentrating naphthenes having a ring composed of 6 carbon atoms. A further object is to provide a method for substantially completely removing naphthenes from hydrocarbon fractions.

According to the present invention an alkyl fluoride or a cycloalkyl fluoride and boron trifluoride are brought together in the presence of one or more naphthenes having a ring composed of 5 carbon atoms in admixture with one or more naphthenes containing a ring composed of 6 carbon atoms. In the process, naphthenes containing a ring of 5 carbon atoms are converted to a higher boiling material and hence are readily separable from the reaction mixture. Naphthenes having a ring of 6 carbon atoms are substantially inert in the process.

The present invention thus provides a process for converting naphthenes having a ring composed of 5 carbon atoms and at least 1 tertiary hydrogen atom attached to a nuclear carbon atom, in the presence of cyclohexanes, to higher boiling materials by bringing together in contact therewith, $BF_3$ and an organic fluoride, namely an alkyl fluoride or a cycloalkyl fluoride, which higher boiling products are readily separable from the reaction mixture by distillation. The cyclohexanes are inert in the present reaction.

To illustrate the process of the present invention, by contacting $BF_3$ with an alkyl fluoride in the presence of methylcyclopentane and methylcyclohexane, the hydrocarbon portion of the alkyl fluoride alkylates the methylcyclopentane to form a polyalkyl cyclohexane of substantially higher boiling point than the initial components, so that the product is readily separable by distillation.

In bringing together the organic fluoride and $BF_3$, the fluoride can be introduced into the naphthenes to which $BF_3$ has already been added, or the $BF_3$ can be introduced into a solution of the fluoride in the naphthenes or the fluoride and $BF_3$ can be introduced simultaneously but separately into the naphthenes. It is also permissible first to dissolve the alkyl fluoride and $BF_3$ in the separate portions of the mixture of naphthenes, or of any component thereof, and then bring together the separate portions to effect reaction. t is not permissible, however, to premix the fluoride and $BF_3$ and then add the mixture to the naphthenes, for in such case the catalytic condition will be immediately spent when the fluoride and $BF_3$ are brought into contact with each other. No reaction is observed on the separate addition of the fluoride or $BF_3$ to either or both of the naphthenes; it is only when the fluoride and $BF_3$ are brought together in the presence of the naphthenes as above-described that the present reaction occurs. If unsaturated hydrocarbons such as olefins or cyclo-olefins are present, operation should be carried out so that contact between the unsaturated hydrocarbon and $BF_3$ is prevented except in the presence of the other components of the reaction, since otherwise polymerization of the olefin will be observed. It appears that the catalytic effect is produced by the extraction of the fluorine atoms from the fluoride by the $BF_3$ resulting in the formation of carbonium ions which initiate the various reactions, and which may enter certain reactions, as hereinafter described.

Alkyl fluorides, cycloalkyl fluorides and $BF_3$ are all soluble in naphthenes and form a homogeneous phase therewith irrespective of their mode of addition, so that reaction does not depend upon contact between separate phases, and hence the mechanical agitation required to provide contact between phases is unnecessary. This is a significant advantage over processes involving contact between separate phases, such as hydrocarbon reactions catalyzed by Friedel-Crafts catalysts including for example aluminum chloride or hydrogen fluoride. It is characteristic of the present process that the reaction occurs instantaneously, i. e. the reaction is complete as soon as the components are mixed. This also is a substantial advantage over processes requiring contact between separate phases in that the size of reactors, because of the rapid throughput which is limited only by practical considerations, is reduced to a minimum.

Upon completion of the reaction, the mixture becomes heterogeneous due to separation of a sludge from the hydrocarbon phase. This sludge may be conveniently separated by physical methods such as decanting or centrifuging. This material contains fluorine derived from the organic fluoride together with $BF_3$ in some sort of complex form. On heating the sludge, $BF_3$ and $HF$ are evolved; the $BF_3$ may be recycled and the $HF$ may be used to prepare additional alkyl fluoride or cycloalkyl fluoride for use in the reaction. The final residue may be discarded or used as a fuel.

The naphthenes which are converted to higher boiling products in the present process are the cyclopentanes having at least 1, but not more than 3, alkyl substituents attached to a nuclear carbon atom, and at least 1 tertiary hydrogen atom attached to a nuclear carbon atom. The total number of carbon atoms of the naphthene may vary from 6 to 30. Examples of naphthenes which can be removed are methylcyclopentane, propylcyclopentane, isopropylcyclopentane, and their homologues and isomers including, for example, the various dimethyl, diethyl, methylethyl, methylpropyl, and trimethyl cyclopentanes, and their higher homologues such as hexylcyclopentane, decylcyclopentane, and the like.

By "tertiary hydrogen atom" is meant a hydrogen atom which is attached to a tertiary carbon atom, i. e., a hydrogen atom which is attached to a carbon atom which is also attached to three other carbon atoms.

The described cyclopentanes may be separated from cyclohexane, alkyl substituted cyclohexanes, or any mixture of cyclohexanes. A preferred embodiment of the present process is the concentration of cyclohexanes from mixtures thereof with cyclopentanes in the presence or absence of other materials. Thus, for example, ethylcyclopentane may be separated from methylcyclohexane. It is preferred to employ the present process for the separation of cyclopentanes from petroleum hydrocarbon fractions containing both $C_5$ and $C_6$ ring naphthenes. As illustrative of such petroleum fractions which may be employed, good results are obtained with the following: the 115-121° C. fraction from which 1,1,3-trimethylcyclopentane and 1-methyl-1-ethylcyclopentane are separated from 1,3-, 1,1-, and 1,4-dimethylcyclohexanes; the 121-126° C. fraction from which 1-methyl-3-ethylcyclopentane, 1-methyl-2-ethylcyclopentane and isopropylcyclopentane are separated from 1,2-dimethylcyclohexane; the 126-137° C. fraction from which propylcyclopentane is separated from ethylcyclohexane and trimethylcyclohexanes; the 143-149° C. fraction from which methylpropylcyclopentanes are separated from 1-methyl-3-ethylcyclohexane and 1-methyl-4-ethylcyclohexane; the 149-154° C. fraction from which diethylcyclopentanes and butylcyclopentanes are separated from isopropylcyclohexane and 1-methyl-2-ethylcyclohexane; the 160-171° C. fraction from which methyldiethylcyclopentanes, ethylpropylcyclopentanes and methylbutylcyclopentanes are separated from cyclohexanes boiling within this range, including dimethylpropylcyclohexanes, methyldiethylcyclohexanes, ethylpropylcyclohexane and methylbutylcyclohexanes. Higher boiling fractions may likewise be used, as may fractions boiling over a wider range than indicated above.

The organic fluorides which may be employed are alkyl fluorides and cycloalkyl fluorides. The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with $BF_3$ to promote catalytic action and reaction in accordance with the invention. The temperature at which such catalytic action will be obtained varies, however, with the type of fluoride employed. The activity of the fluorides has been found to increase in the order of primary: secondary:tertiary. Thus, a higher temperature is necessary to obtain the desired catalytic effect with a secondary fluoride than with a tertiary fluoride; and a still higher temperature is required when a primary fluoride is employed. As a general rule the minimum temperatures at which the fluorides in combination with $BF_3$ will begin to exert substantial catalytic action are approximately as follows:

tertiary fluorides—minus 120° C.
secondary fluorides—minus 90° C.
primary fluorides—minus 10° C.

One exception is ethyl fluoride which has been found to be somewhat more inert than the alkyl fluorides having three or more carbon atoms per molecule and which requires a temperature of about +20° C. in order to give rise to substantial catalytic action. Methyl fluoride in combination with $BF_3$ does not give any substantial catalytic effect at least at temperatures below +150° C. and is not considered within the scope of the present invention.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methyl butane; n-hexyl fluoride; and similar fluoride derivatives of hexanes, heptanes, octanes, or the like. As specific illustrations of secondary fluorides, the following may be mentioned: isopropyl fluoride; 2-fluoro-butane; 2-fluoro-3-methyl butane; and 2-fluoro-3,3-dimethyl butane. A few specific examples of tertiary fluorides are: t-butyl fluoride; t-amyl fluoride; 2-fluoro-2,3-dimethyl butane, and other t-hexyl fluorides; t-heptyl fluorides; and 2-fluoro-2,4,4-trimethylpentane and other t-octyl fluorides. It will be understood that the specific compounds named above are given merely by way of illustration and that any alkyl fluoride (with the exception of methyl fluoride) will produce an operative catalytic combination with $BF_3$ provided the temperature is above the values as set forth above.

The cycloalkyl fluorides which may be employed in the present process are those having either a 5 carbon atom ring or a 6 carbon atom ring, which are the cyclohexyl fluorides and the cyclopentyl fluorides, including cyclohexyl fluoride and cyclopentyl fluoride and alkyl substituted derivatives thereof, such as 2-methylcyclohexyl fluoride; 3-methylcyclohexyl fluoride; 4-methylcyclohexyl fluoride; 1-methylcyclohexyl fluoride; 1-methylcyclopentyl fluoride; 2-methylcyclopentyl fluoride; 1-ethylcyclopentyl fluoride; and homologues and isomers of the described fluorides, such as the ethyl, dimethyl, and methylethyl homologues. Preferably, the cyclic fluoride should not have more than a total of 30 carbon atoms per molecule. The described fluorides have the fluorine atom attached to a carbon atom of the naphthene ring, and such fluorides are preferred. It is permissible, however, to have the fluorine atom attached to a carbon atom which in turn is attached to a carbon atom of the naphthene ring, such as fluoromethylcyclopentane, and such fluorides are included in the terms "cyclic fluoride" and "cycloalkyl fluoride." It is believed such fluorides form, under the conditions of the present process, carbonium ions identical to those of the preferred fluorides. The temperatures given above for alkyl fluorides also apply to the various primary, secondary, and tertiary cycloalkyl fluorides.

The present cyclic fluorides are conveniently prepared by adding hydrogen fluoride to the cyclic olefin corresponding to the desired cyclic fluoride. For example, adding hydrogen fluoride to cyclohexene gives cyclohexyl fluoride, and adding hydrogen fluoride to cyclopentane gives cyclopentyl fluoride, both of which fluorides are preferred components of the present process. The alkyl fluorides may also be prepared by adding hydrogen fluoride to the olefin corresponding to the desired fluoride.

The exact reaction which will occur depends upon the components of the reaction mixture. Thus, with a mixture of cyclopentanes and cyclohexanes, using $BF_3$ and an alkyl fluoride, the cyclopentane is selectively converted to polyalkylcyclohexanes and polyalkyldecalins; if an olefin is present in the reaction mixture, it is alkylated by the alkyl fluoride while the cyclopentane is converted to polyalkyldecalins. Using the same mixture and substituting a cycloalkyl fluoride for the alkyl fluoride, the cyclopentane is converted to polyalkyldecalins; if an olefin or cyclo-olefin is present the cycloalkyl fluoride alkylates the olefin or cyclo-olefin, while the cyclopentane is converted to polyalkyldecalins, and hence olefins and cyclo-olefins are removed by the present process. If isoparaffins are present in the above reactions, the cyclopentanes are first converted as above-described, after which the isoparaffin may undergo one or more of the reactions described in patent application Serial No. 38,167, filed July 10, 1948, now Patent No. 2,557,113, and hence a preferred embodiment of the present process is to employ a quantity or organic fluoride not in excess of the amount required to convert the alkyl substituted cyclopentane. Normal paraffins are inert in the present process and if present serve as inert diluents. Aromatics should be substantially absent from the reaction mixture.

From the foregoing it will be apparent that the present process is applicable to a wide variety of hydrocarbon mixtures containing cyclopentanes and cyclohexanes, the essence of the invention being the selective conversion of alkyl substituted cyclopentanes to higher boiling hydrocarbons in the presence of cyclohexanes by bringing together $BF_3$ and an organic fluoride in admixture with the alkyl substituted cyclopentanes and cyclohexanes, and separating the so-formed higher boiling hydrocarbons from the reaction mixture.

The concentrations of the reaction mixture components may be varied and good results obtained. In general, the mole ratio of cyclohexanes to cyclopentanes should be above 1 in order to obtain good results, but may vary from about 0.1:1 to 20:1. The mole ratio of organic fluoride to cyclopentanes may vary from about 0.1:1 to 5:1, but a higher ratio up to about 10:1 may be employed in the event that substantially complete removal of the cyclopentane is desired, and where other materials which would enter the reaction on using an excess of organic fluoride are substantially absent, or where the reaction is not a material factor in the process. The quantity of $BF_3$ is not critical, only a small amount, a catalytic quantity, being sufficient to initiate the reaction which then proceeds to completion. However, it is preferred to employ a somewhat larger quantity of $BF_3$ than is required to initiate the reaction, since a more clean-cut reaction is obtained. It is preferred to employ a quantity of $BF_3$ so that the mole ratio of $BF_3$ to organic fluoride is from 0.05:1 to 1:1, but even higher concentrations may be employed if desired.

The present reaction is conducted in the liquid phase. The pressure to employ is advantageously that of the $BF_3$ at the temperature of the reaction. Operating at a temperature within the preferred range, the pressure will be from about 100 to 200 p. s. i. g., but may vary from about 10 to 500 p. s. i. g.

The following examples illustrate specific embodiments of the process of the present invention, in which "parts" refers to parts by weight:

*Example 1*

To a solution of 100 parts of methylcyclohexane, 91 parts of methylcyclopentane, 351 parts of isopentane, and 13.3 parts of $BF_3$ was added a solution of 93.3 parts of tertiary butyl fluoride and 171 parts of isopentane at a temperature of 20° C., the pressure being about 100 p. s. i. g. The mole ratio of methylcyclohexane to methylcyclopentane was 0.898, the mole ratio of methylcyclopentane to alkyl fluoride was 0.892, and the mole ratio of $BF_3$ to alkyl fluoride was 0.198.

On mixing the two solutions the reaction occurrent immediately, the pressure rapidly decreasing to about 10 p. s. i. g. A lower layer, consisting of 63.5 parts, separated out and was removed by decanting.

The organic layer was washed, dried, and distilled. There were recovered 412 parts of isopentane, 36.9 parts of methylcyclopentane and 97 parts of methylcyclohexane. Thus 60% of the methylcyclopentane was converted to higher boiling hydrocarbons which were easily separable from the methylcyclohexane. Practically 100% of the methylcyclohexane was recovered.

Higher boiling materials, products formed from methylcyclopentane, included 24.4 parts of trimethylethylcyclohexane, 14.2 parts of tetramethylcyclohexanes, and 15.1 parts of dimethyldecalins. A quantity of isobutane, 35.9 parts, was also recovered, as was a small quantity of hexanes and heptanes, which were apparently disproportionation products of isopentane.

*Example 2*

The procedure of Example 1 was repeated at 25° C. using the same reactants. The mole ratio of methylcyclohexane to methylcyclopentane was 0.90, the mole ratio of methylcyclopentane to tertiary butyl fluoride was 0.80, and the mole ratio of $BF_3$ to tertiary butyl fluoride was 0.071.

Substantially the same results as described for Example 1 were obtained, over 64% of the methylcyclopentane being converted to higher boiling materials. A quantative recovery of methylcyclohexane was obtained.

In the above examples, the use of a larger quantity of alkyl fluoride would cause conversion of a larger quantity of the methylcyclopentane. Also, in the absence of hydrocarbons which undergo reaction in the present process, such as isoparaffins having a tertiary hydrogen atom, conversion of the methylcyclopentane can be made to approach completion to form higher boiling hydrocarbons, so that the product is substantially pure methylcyclohexane.

The above examples illustrate specific embodiments of the present invention. A further specific embodiment is the use of the present invention to prepare a substantially naphthene free hydrocarbon fraction. This is accomplished by subjecting a hydrocarbon fraction, such as the 160–171° C. petroleum fraction containing cyclopentanes, cyclohexanes, and paraffins, to the action of $BF_3$ and an organic fluoride brought together as herein described. The cyclopentanes are converted to higher boiling hydrocarbons which are separated by distillation. The fraction is then subjected to dehydrogenation such as by contacting with a dehydrogenating catalyst under dehydrogenating conditions, such as with platinum deposited on charcoal at a temperature of about 300° C. By dehydrogenation, the cyclohexanes are converted to aromatics which are then separated from the fraction by heretofore known methods such as by adsorption on silica gel. The resulting fraction is substantially free of naphthenes.

In patent application Serial No. 231,052, filed June 11, 1951, there is described and claimed the reaction of isoparaffins having at least 1 tertiary hydrogen atom per molecule to form alkyl substituted naphthenes by bringing together a cycloalkyl fluoride and $BF_3$ in the presence of the naphthene.

In patent application Serial No. 231,054, filed June 11, 1951, there is described and claimed the reactions of cyclopentanes having at least 1 tertiary hydrogen atom attached to a nuclear carbon atom by bringing together $BF_3$ and an alkyl fluoride in the presence of the naphthene to form polyalkyl naphthenes.

In patent application Serial No. 231,055, filed June 11, 1951, there is described and claimed the reactions between cyclopentanes having at least 1 tertiary hydrogen atom attached to a nuclear carbon atom and olefins, including cyclo-olefins, by bringing together $BF_3$ and an alkyl fluoride in the presence of a mixture of the cyclopentane and olefin to form branched chain paraffins and alkyl substituted naphthenes.

In patent application Serial No. 231,056, filed June 11, 1951, there is described and claimed the reactions of cyclopentanes having at least 1 tertiary hydrogen atom attached to a nuclear carbon atom or isoparaffins having at least 1 tertiary hydrogen atom with olefins by bringing together $BF_3$ and a cycloalkyl fluoride in the presence of a mixture thereof to form alkylated and polyalkylated naphthenes.

In patent application Serial No. 231,053, filed June 11, 1951, there is described and claimed the dimerization of cyclopentanes having at least 1 tertiary hydrogen atom attached to a nuclear carbon atom by bringing together $BF_3$ and cycloalkyl fluoride in the presence of the naphthene.

In patent application Serial No. 231,057, filed June 11, 1951, there is described and claimed the reactions between cyclopentanes having at least 1 tertiary hydrogen atom attached to a nuclear carbon atom and a cyclo-olefin by bringing together $BF_3$ and a cycloalkyl fluoride in the presence of a mixture thereof to form the alkylation product of the naphthene and cyclo-olefin and other hydrocarbons.

The invention claimed is:

1. Method of separating a cyclopentane from a cyclohexane which comprises bringing together, in liquid homogeneous phase, $BF_3$ and an organic fluoride in the presence of a cyclopentane and a cyclohexane whereby said cyclopentane is instantaneously converted to higher boiling hydrocarbons, and separating said higher boiling hydrocarbons from the reaction mixture.

2. Method according to claim 1 wherein said organic fluoride is selected from the group consisting of alkyl fluorides having at least 2 carbon atoms per molecule and cycloalkyl fluorides.

3. Method according to claim 2 wherein said cyclopentane has from 1 to 3 alkyl substituents and at least 1 tertiary hydrogen atom attached to a nuclear carbon atom.

4. Method of separating a cyclopentane having from 1 to 3 alkyl substituents and at least 1 tertiary hydrogen atom attached to a nuclear carbon atom from a cyclohexane which comprises bringing together, in liquid homogeneous phase, $BF_3$ and an organic fluoride selected from the group consisting of alkyl fluorides having at least 2 carbon atoms and cycloalkyl fluorides in the presence of said cyclopentane and said cyclohexane at a temperature sufficient to cause instantaneous reaction of said cyclopentane to form higher boiling hydrocarbons, said temperature being in the range of from −120° C. to 150° C., and separating said higher boiling hydrocarbons from the reaction mixture.

5. Method according to claim 4 wherein said organic fluoride is a tertiary alkyl fluoride.

6. Method according to claim 4 wherein said organic fluoride is tertiary butyl fluoride.

7. Method according to claim 4 wherein said organic fluoride is a secondary alkyl fluoride.

8. Method according to claim 4 wherein said organic fluoride is isopropyl fluoride.

9. Method according to claim 4 wherein said organic fluoride is a primary alkyl fluoride having at least 2 carbon atoms.

10. Method according to claim 4 wherein said organic fluoride is 1-fluoro-3,3-dimethylbutane.

11. Method according to claim 4 wherein said organic fluoride is a cyclohexyl fluoride.

12. Method according to claim 4 wherein said organic fluoride is cyclohexyl fluoride.

13. Method according to claim 4 wherein the organic fluoride is a cyclopentyl fluoride.

14. Method according to claim 4 wherein the organic fluoride is cyclopentyl fluoride.

15. Method for the concentration of cyclohexanes in a hydrocarbon mixture containing the same and cyclopentanes having from 1 to 3 alkyl substituents and at least 1 tertiary hydrogen atom which comprises bringing together in liquid homogeneous phase, in the presence of said hydrocarbon mixture, $BF_3$ and an organic fluoride selected from the group consisting of alkyl fluorides having at least 2 carbon atoms and cycloalkyl fluorides at a temperature sufficient to cause instantaneous reaction of said cyclopentanes to form a higher boiling hydrocarbon, and separating said higher boiling hydrocarbon from the reaction mixture.

16. Method of removing naphthenes from a petroleum hydrocarbon fraction containing naphthenes having a ring composed of 5 carbon atoms, naphthenes having a ring composed of 6 carbon atoms, and paraffins, which comprises bringing together, in liquid homogeneous phase, $BF_3$ and an organic fluoride selected from the group consisting of alkyl fluorides having at least 2 carbon atoms and cycloalkyl fluorides at a temperature sufficient to cause instantaneous reaction of said naphthenes having a ring composed of 5 carbon atoms to form higher boiling hydrocarbons, separating said higher boiling hydrocarbons from the reaction mixture, subjecting the remaining hydrocarbons to dehydrogenating conditions in contact with a dehydrogenating catalyst whereby naphthenes having a ring composed of 6 carbon atoms are converted to aromatics, and separating said aromatics from the reaction mixture.

17. Method of separating ethylcyclopentane from methylcyclohexane which comprises bringing together, in liquid homogeneous phase, $BF_3$ and an organic fluoride selected from the group consisting of alkyl fluorides having at least 2 carbon atoms and cycloalkyl fluorides in the presence of a mixture of ethylcyclopentane with methylcyclohexane at a temperature sufficient to cause instantaneous reaction of said ethylcyclopentane to form higher boiling hydrocarbons, and separating said higher boiling hydrocarbons from the reaction mixture.

References Cited in the file of this patent

UNITED STATES PATENTS

| Number | Name | Date |
|---|---|---|
| 2,315,078 | Pines et al. | Mar. 30, 1943 |